US010616747B2

(12) United States Patent
Piett et al.

(10) Patent No.: US 10,616,747 B2
(45) Date of Patent: *Apr. 7, 2020

(54) REAL-TIME OVER THE TOP 9-1-1 CALLER LOCATION DATA

(71) Applicant: Rave Wireless, Inc., Framingham, MA (US)

(72) Inventors: William Todd Piett, Southborough, MA (US); Matthew A. Serra, Newton, MA (US); Brett Wilfred Marceau, Clinton, MA (US)

(73) Assignee: Rave Wireless, Inc., Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,236

(22) Filed: Jul. 15, 2019

(65) Prior Publication Data

US 2019/0342742 A1 Nov. 7, 2019

Related U.S. Application Data

(63) Continuation of application No. 15/155,935, filed on May 16, 2016, now Pat. No. 10,356,589.

(Continued)

(51) Int. Cl.
*H04M 11/00* (2006.01)
*H04W 4/90* (2018.01)
(Continued)

(52) U.S. Cl.
CPC .......... *H04W 4/90* (2018.02); *H04M 3/42357* (2013.01); *H04M 3/5116* (2013.01); *H04M 7/1295* (2013.01); *H04W 4/02* (2013.01); *H04W 4/029* (2018.02); *H04M 3/42382* (2013.01); *H04M 2207/18* (2013.01); *H04M 2242/04* (2013.01)

(58) Field of Classification Search
CPC ........................... H04W 4/22; H04M 3/42357
See application file for complete search history.

(56) References Cited

U.S. PATENT DOCUMENTS 5,742,666 A * 4/1998 Alpert ............. H04M 1/274575
455/404.2
6,650,901 B1 * 11/2003 Schuster ............. H04M 1/2473
379/142.1

(Continued)

*Primary Examiner* — Charles T Shedrick
(74) *Attorney, Agent, or Firm* — Proskauer Rose LLP

(57) ABSTRACT

Described herein are systems and methods for determining and managing the location of a calling device during an emergency call. A computing device at a data store establishes a connection with a computing device at a public safety access point (PSAP). The connection is established upon activation of an emergency function at a calling device coupled to the computing device at the PSAP via a first communications channel. The calling device is associated with a unique identifier. The computing device at the data store receives location data for the calling device, where the calling device streams the location data to the data store via a second communications channel upon activation of the emergency function. The computing device at the data store makes the location data for the calling device available to the computing device at the PSAP using the unique identifier.

22 Claims, 8 Drawing Sheets

Related U.S. Application Data

(60) Provisional application No. 62/162,263, filed on May 15, 2015.

(51) Int. Cl.
*H04M 3/42* (2006.01)
*H04M 3/51* (2006.01)
*H04W 4/029* (2018.01)
*H04M 7/12* (2006.01)
*H04W 4/02* (2018.01)

(56) References Cited

U.S. PATENT DOCUMENTS

| | | | | |
|---|---|---|---|---|
| 7,215,638 | B1* | 5/2007 | Roberts | H04L 29/06027 |
| | | | | 370/231 |
| 7,734,019 | B1* | 6/2010 | Terpstra | H04W 4/90 |
| | | | | 379/37 |
| 9,185,535 | B2* | 11/2015 | Ebersberger | G08B 21/0269 |
| 9,706,351 | B1* | 7/2017 | Brewer | H04W 4/90 |
| 2005/0003797 | A1* | 1/2005 | Baldwin | H04W 4/90 |
| | | | | 455/404.1 |
| 2006/0281437 | A1* | 12/2006 | Cook | H04L 29/06027 |
| | | | | 455/404.2 |
| 2008/0305763 | A1* | 12/2008 | Wijayanathan | H04M 3/42195 |
| | | | | 455/404.2 |
| 2010/0020942 | A1* | 1/2010 | Olshansky | H04M 7/006 |
| | | | | 379/45 |
| 2016/0105784 | A1* | 4/2016 | Gellens | H04M 3/5116 |
| | | | | 455/404.1 |

* cited by examiner

REAL-TIME OVER THE TOP 9-1-1 CALLER LOCATION DATA

RELATED APPLICATIONS

This application claims priority to U.S. patent application Ser. No. 15/155,935, filed on May 16, 2016, which claims priority to U.S. Provisional Patent Application No. 62/162,263, filed on May 15, 2015.

TECHNICAL FIELD

This application relates generally to methods and apparatuses, including computer program products, for emergency communications, and in particular, for 9-1-1 services.

BACKGROUND

Now that most callers use mobile devices, locating an emergency caller has become a critical component of the emergency response process. Known technologies used to identify a caller's location can include but are not limited to trilateralization and/or triangulation off of cell tower signals or other RF signals, IP-access point identification, near-field communications (NFC), and GPS.

In today's network, the location used to initially route a mobile call is often based off the cell tower sector with which the device is communicating. The local network has a mobile positioning center that can then request an update for a more accurate location. This requesting process is known in the industry as "rebidding."

The location information is provided through an automatic location identification (ALI) database and made available to the Public Safety Access Point (PSAP) on its local equipment. The rebid location provides the call taker/dispatcher at the PSAP with a more accurate, and optimally "dispatch-quality" location than what is available through the coarse cell-tower or cell-sector determined location used for initial call routing. As used herein, a "dispatch-quality" location is a location that is accurate enough to direct a first responder directly to the location of the device used to place the 9-1-1 call.

Existing location technologies rely on the network to identify the dispatchable location of the caller, either through the trilaterilizaton or triangulation techniques, or GPS. It is also done by request.

In contrast many commercial location technologies reside on the handset itself. Such systems use the device's own computational power to calculate its location based on whatever technologies are available. Increasingly, devices are able to use a broad spectrum of RF signals, GPS and even embedded barometric pressure devices to calculate the device's latitude, longitude, and altitude or floor. Devices can do all this more accurately than network-based technologies. In many cases the device's location accuracy also improves over time as the device is able to recognize more signals and clear any internal caches on the device itself that may exist from previous attempts to fix location.

There are several challenges to utilizing handset-based technologies for 9-1-1 and emergency calling purposes.

First, in an emergency, call connect time is critical. Many technologies take ten to thirty seconds to calculate a granular location. This is no problem for mere navigation. But is a significant issue for an emergency.

Second, the current network is not designed to have the device push a location directly into the network. The network itself routes the call based on the cell tower and sometimes the cell sector serving the call. It then forwards the call to the PSAP that has been pre-determined to serve the identified caller area. Although this allows for rapid routing of the 9-1-1 call to the PSAP, it does not lend itself to providing "dispatch-quality" location data.

The location data used for routing is made available through the ALI database, which can be queried by PSAP systems. As time progresses, subsequent rebids of the caller's location may produce more accurate location data for the caller. However, the current E911 architecture is unable to provide dispatch-quality location on enough calls to satisfy either the public or public safety practitioners (see FCC Wireless E911 Location Accuracy Requirements, Fourth Report and Order, Released Feb. 3, 2015). E911 networks are not designed to carry location data. They are primarily designed for calls. Finally, the existing systems rely on the PSAP requesting location updates through a "re-bid" process; the emergency operator is not proactively notified of location updates (e.g. to identify when more accurate location data is available, and/or the caller has moved).

Additionally, it is becoming prevalent for a 9-1-1 "call" to include or to consist of only a communication using some other medium, including text messaging, instant messaging, videos, email, etc. In the United States, the public safety industry has undertaken a massive effort, termed NG911, to design and enable an infrastructure to support these new forms of communication at the over six thousand PSAPs that answer 9-1-1 calls.

SUMMARY

The methods and systems described herein solve the limitation of existing 9-1-1 location technologies by separating call routing from call location. In particular, the location data and processes used to route a 9-1-1 call to a specific PSAP are separated from the location data and processes used to specifically locate the caller and dispatch first responders to the caller's location by making caller location data available "over the top" of the current network. This technique will be referred to herein as "Over-the-Top Streaming Location" or "OTSL."

The invention, in one aspect, features a computerized method of determining and managing the location of a calling device during an emergency call. A computing device at a data store establishes a connection with a computing device at a public safety access point (PSAP). The connection is established upon receipt of an emergency call at the computing device at the PSAP from a calling device via a first communications channel, where the calling device is associated with a unique identifier. The computing device at the data store receives location data for the calling device, where the calling device streams the location data to the data store via a second communications channel upon initiation of the emergency call. The computing device at the data store makes the location data for the calling device available to the computing device at the PSAP using the unique identifier.

The invention, in another aspect, features a system for determining and managing the location of a calling device during an emergency call. The system comprises a computing device at a data store that is configured to establish a connection with a computing device at a public safety access point (PSAP). The connection is established upon receipt of an emergency call at the computing device at the PSAP from a calling device via a first communications channel, where the calling device is associated with a unique identifier. The computing device at the data store is configured to receive location data for the calling device, where the calling device streams the location data to the data store via a second communications channel upon initiation of the emergency call. The computing device at the data store is configured to make the location data for the calling device available to the computing device at the PSAP using the unique identifier.

The invention, in another aspect, features a computer program product, tangibly embodied in a non-transitory computer readable storage device, for determining and managing the location of a calling device during an emergency call. The computer program product includes instructions operable to cause a computing device at a data store to establish a connection with a computing device at a public safety access point (PSAP). The connection is established upon receipt of an emergency call at the computing device at the PSAP from a calling device via a first communications channel, where the calling device is associated with a unique identifier. The computer program product includes instructions operable to cause the computing device at the data store to receive location data for the calling device, where the calling device streams the location data to the data store via a second communications channel upon initiation of the emergency call. The computer program product includes instructions operable to cause the computing device at the data store to make the location data for the calling device available to the computing device at the PSAP using the unique identifier.

The invention, in another aspect, features a computerized method of determining and managing the location of a calling device during an emergency call. A computing device at a public safety access point (PSAP) receives an emergency call from a calling device via a first communications channel, where the calling device is associated with a unique identifier. The computing device at the PSAP retrieves location data for the calling device from a computing device at a data store using the unique identifier, where the calling device streams the location data to the computing device at the data store via a second communications channel upon initiation of the emergency call.

The invention, in another aspect, features a system for determining and managing the location of a calling device during an emergency call. The system includes a computing device at a public safety access point (PSAP), a calling device coupled to the computing device at the PSAP via a first communications channel, and a computing device at a data store coupled between the calling device and the computing device at the PSAP via a second communications channel. The computing device at the PSAP is configured to receive an emergency call from a calling device via a first communications channel, where the calling device is associated with a unique identifier. The computing device at the PSAP is configured to retrieve location data for the calling device from the computing device at the data store using the unique identifier, where the calling device streams the location data to the computing device at the data store via a second communications channel upon initiation of the emergency call.

The invention, in another aspect, features a computer program product, tangibly embodied in a non-transitory computer readable storage device, for determining and managing the location of a calling device during an emergency call. The computer program product includes instructions operable to cause a computing device at a public safety access point (PSAP) to receive an emergency call from a calling device via a first communications channel, where the calling device is associated with a unique identifier. The computer program product includes instructions operable to cause the computing device at the PSAP to retrieve location data for the calling device from a computing device at a data store using the unique identifier, where the calling device streams the location data to the computing device at the data store via a second communications channel upon initiation of the emergency call.

Any of the above aspects can include one or more of the following features. In some embodiments, the computing device at the data store makes the location data for the calling device available to a remote computing device associated with emergency personnel. In some embodiments, the first communications channel is a public switched telephone network and the second communications channel is a packet-based data network. In some embodiments, the first communications channel includes at least in part a packet-based data network established for completing emergency calls, and the second communications channel is a packet-based data network.

In some embodiments, the emergency call is initiated at the calling device by dialing an emergency number, by accessing an emergency function in a software application, upon expiration of a safety timer, or upon physical proximity of the calling device to an emergency event.

In some embodiments, the computing device at the PSAP automatically retrieves the location data for the calling device from the computing device at the data store upon receipt of the emergency call. In some embodiments, the computing device at the data store automatically transmits the location data for the calling device to the computing device at the PSAP upon receiving the location data from the calling device. In some embodiments, the calling device begins streaming location data to the computing device at the data store when the emergency call is placed. In some embodiments, the computing device at the data store sends a message to the calling device to request initiation of the location data streaming. In some embodiments, the message is sent to the calling device in response to the emergency call detected by the computing device at the PSAP. In some embodiments, the message is sent to the calling device when the calling device has terminated the location data streaming but the location data is still desired by the computing device at the PSAP.

In some embodiments, the computing device at the data store tracks movement of the calling device over time using the location data. In some embodiments, the location data includes data to estimate a location of the calling device.

In some embodiments, the computing device at the data store authenticates the calling device upon receiving streamed location data from the calling device. In some embodiments, the computing device at the data store authenticates the computing device at the PSAP prior to making location data available to the computing device at the PSAP. In some embodiments, the computing device at the data store authenticates the remote computing device prior to making location data available to the remote computing device. In some embodiments, the computing device at the data store combines the streamed location data with reference location data to improve the accuracy of the streamed location data.

In some embodiments, the computing device at the PSAP displays a location of the calling device based upon the retrieved location data. In some embodiments, the computing device at the PSAP makes the location data for the calling device available to a remote computing device associated with emergency personnel. In some embodiments, the computing device at the PSAP tracks movement of the calling device over time using the location data. In some embodiments, the computing device at the PSAP combines the streamed location data with reference location data to improve the accuracy of the streamed location data.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
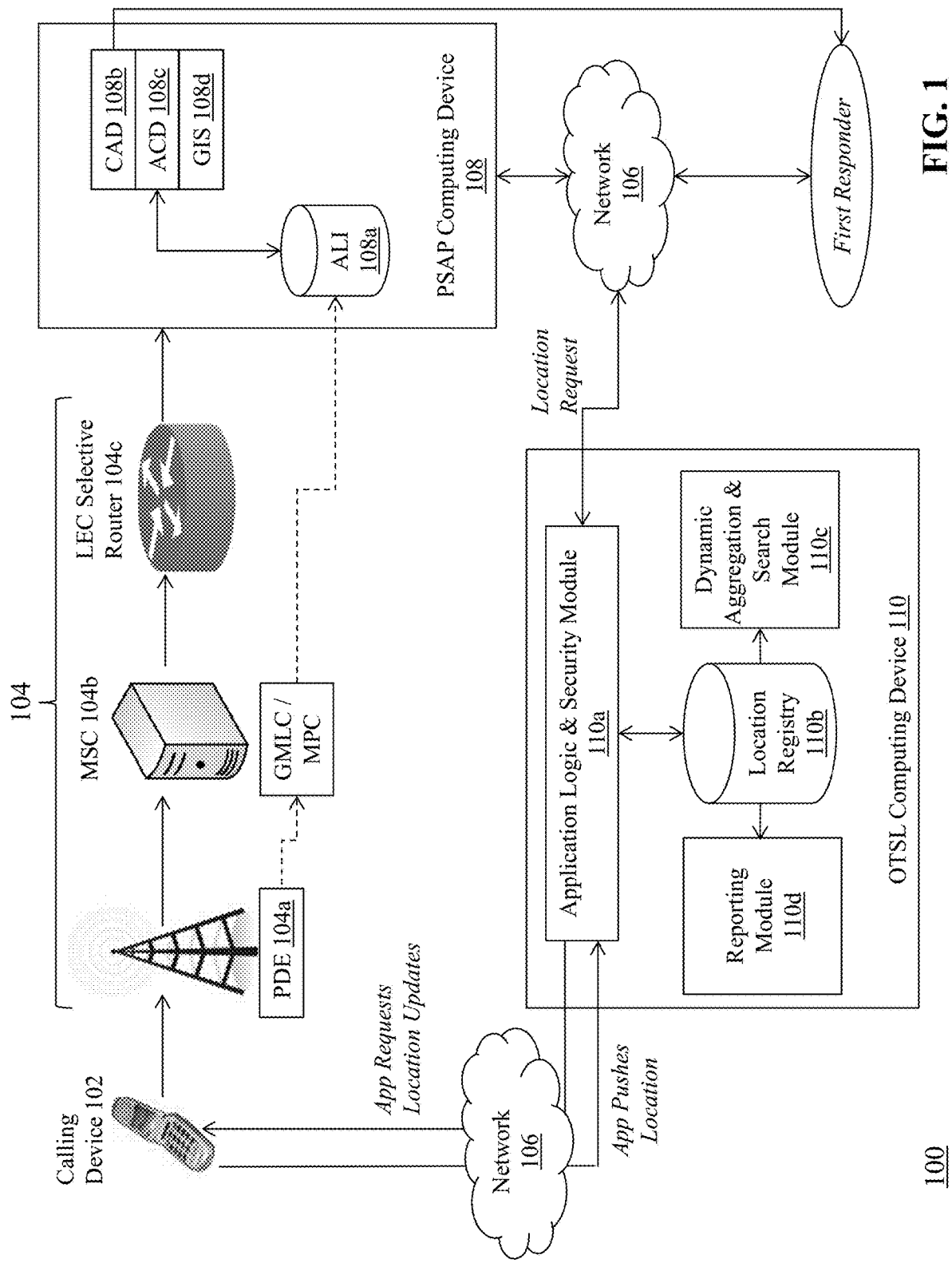
FIG. 1 is a block diagram of a system for determining and managing the location of a calling device during an emergency call.

FIG. 1 is a block diagram of a system 100 for determining and managing the location of a calling device during an emergency call. The system 100 comprises a calling device 102 (e.g., a mobile computing device), a cellular communications network 104 including a tower antenna with associated position determining entity (PDE) 104a, a mobile switching center (MSC) with associated gateway mobile location center (GMLC) and mobile positioning center (MPC) 104b, and a local exchange carrier (LEC) with associated selective router 104c, a packet-based communications network 106 (e.g., internet), a computing device 108 at a public safety access point (PSAP) with an automatic location information (ALI) database 108a and modules 108b-108d, and an OTSL computing device 110 including an application logic and security module 110a, a location registry database 110b, a dynamic aggregation & search module 110c, and a reporting module 110d.

The calling device 102 uses software and circuitry (e.g., processor, memory, antennae) to execute applications, establish telephone calls, and communicate with the computing device 108 at the PSAP and the OTSL computing device 110 using the communications networks 104, 106 for the purposes described herein. Example mobile computing devices 102 can include, but are not limited to, a smart phone (e.g., Apple iPhone®, Windows®, and/or Android™-based device) or other similar mobile communications devices.

The cellular communications network 104 enables the calling device 102 to connect to the computing device 108 at the PSAP for establishing an emergency call. The cellular communications network includes certain components, including PDE 104a, MSC 104b, and LEC 104c, to route the emergency call from the calling device 102 to the computing device 108 at the PSAP based on the calling device's location. It should be appreciated that other types of emergency communications (e.g., text messages) can be transmitted via the cellular communications network 104 as described herein.

The packet-based communications network 106 enables the calling device 102 to connect to the OTSL computing device 110 for transmitting location data as described herein. In some embodiments, the packet-based communications network 106 is a public network, such as the internet, that includes discrete networks and/or sub-networks (including related routing, load balancing, and traffic metering hardware).

The computing device 108 at the PSAP includes specialized hardware and/or software modules that execute on a processor and interact with memory modules of the computing device 108, to receive data from other components of the system 100, transmit data to other components of the system 100, and perform functions for receiving emergency calls from and determining the location of the calling device 102, and communicating with emergency personnel in response to emergency calls. The computing device 108 includes several modules including a computer-aided dispatch (CAD) module 108b, an automatic call distributor (ACD) module 108c, and a geographical information system (GIS) module 108d that execute on the processor of the computing device 108. In some embodiments, the modules 108a-108c are specialized sets of computer software instructions programmed onto one or more dedicated processors in the computing device 108 and can include specifically-designated memory locations and/or registers for executing the specialized computer software instructions. The computing device 108 is also coupled to an automatic location information (ALI) database 108a 108a which may be located in the PSAP, on the network 104 or hosted by a third party and made accessible to the computing device 108. It should also be appreciated that, although shown in FIG. 1 as a single computing device, the functionality of the computing device 108 can be distributed among a plurality of computing devices and/or application service models that are available at the PSAP.

The OTSL computing device 110 includes specialized hardware and/or software modules that execute on a processor and interact with memory modules of the OTSL computing device 110, to receive location data from the calling device 102 and transmit the location data to other components of the system 100 such as the computing device 108 at the PSAP for and determining the location of the calling device 102 during an emergency call, as described herein. The OTSL computing device 110 includes an application logic and security module 110a, a location registry database 110b, a dynamic aggregation & search module 110c, and a reporting module 110d—the functionality of which will be described in greater detail below.

Figure 2A:
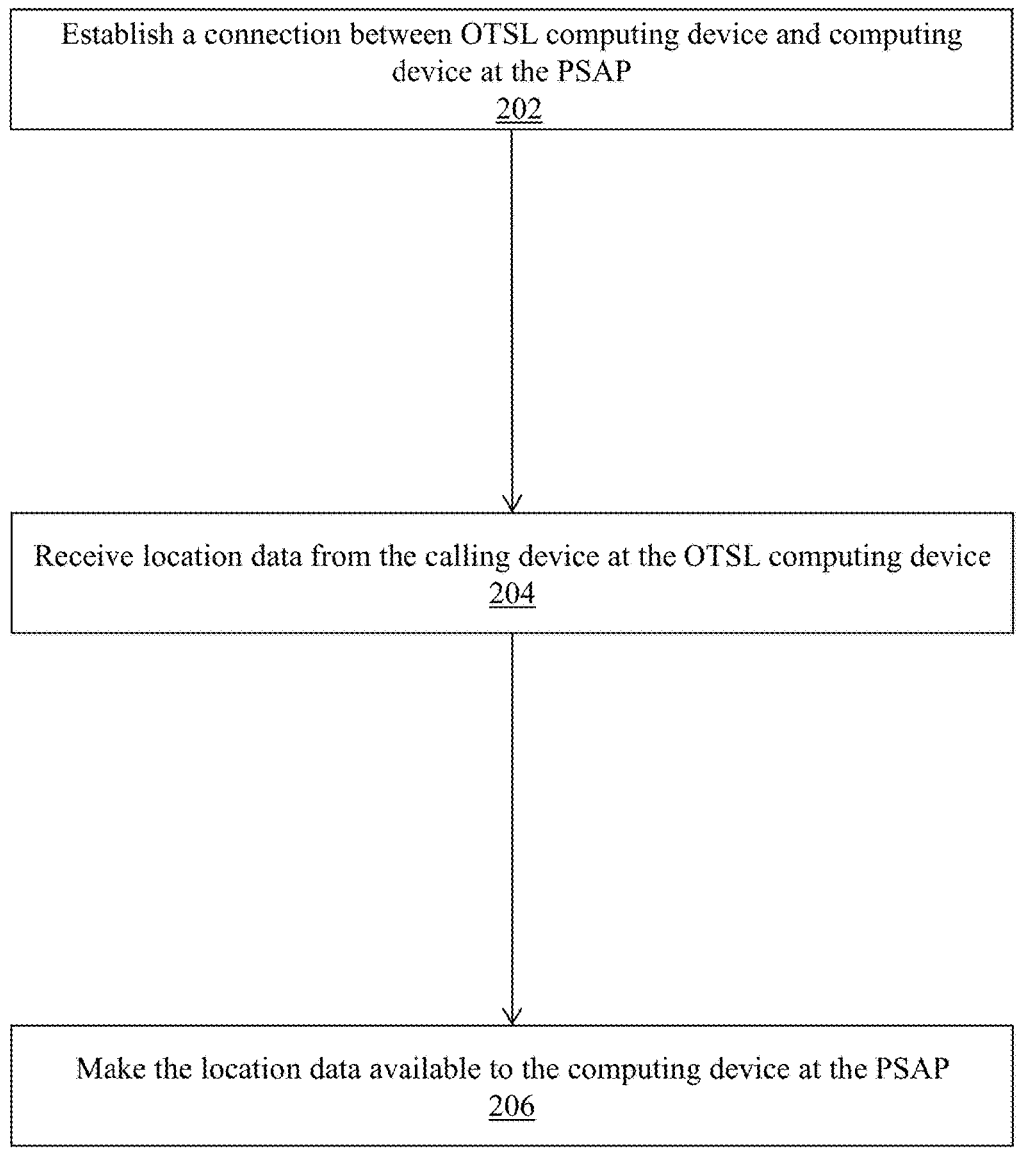
FIG. 2A is a flow diagram of a method for determining and managing the location of a calling device during an emergency call.

FIG. 2A is a flow diagram of a method 200 for determining and managing the location of a calling device during an emergency call, using the system 100 of FIG. 1. The OTSL computing device 110 establishes (202) a connection with the computing device 108 at the PSAP. The connection is established upon receipt of an emergency call at the computing device 108 at the PSAP from the calling device 102 via the cellular communications network 104. The OTSL computing device 110 receives (204) location data from the calling device 102, which streams the location data to the OTSL computing device 110 via the packet-based communications network 106 upon initiation of the emergency call. The OTSL computing device 110 makes (206) the location data available to the computing device 108 at the PSAP using the unique identifier.

Figure 2B:
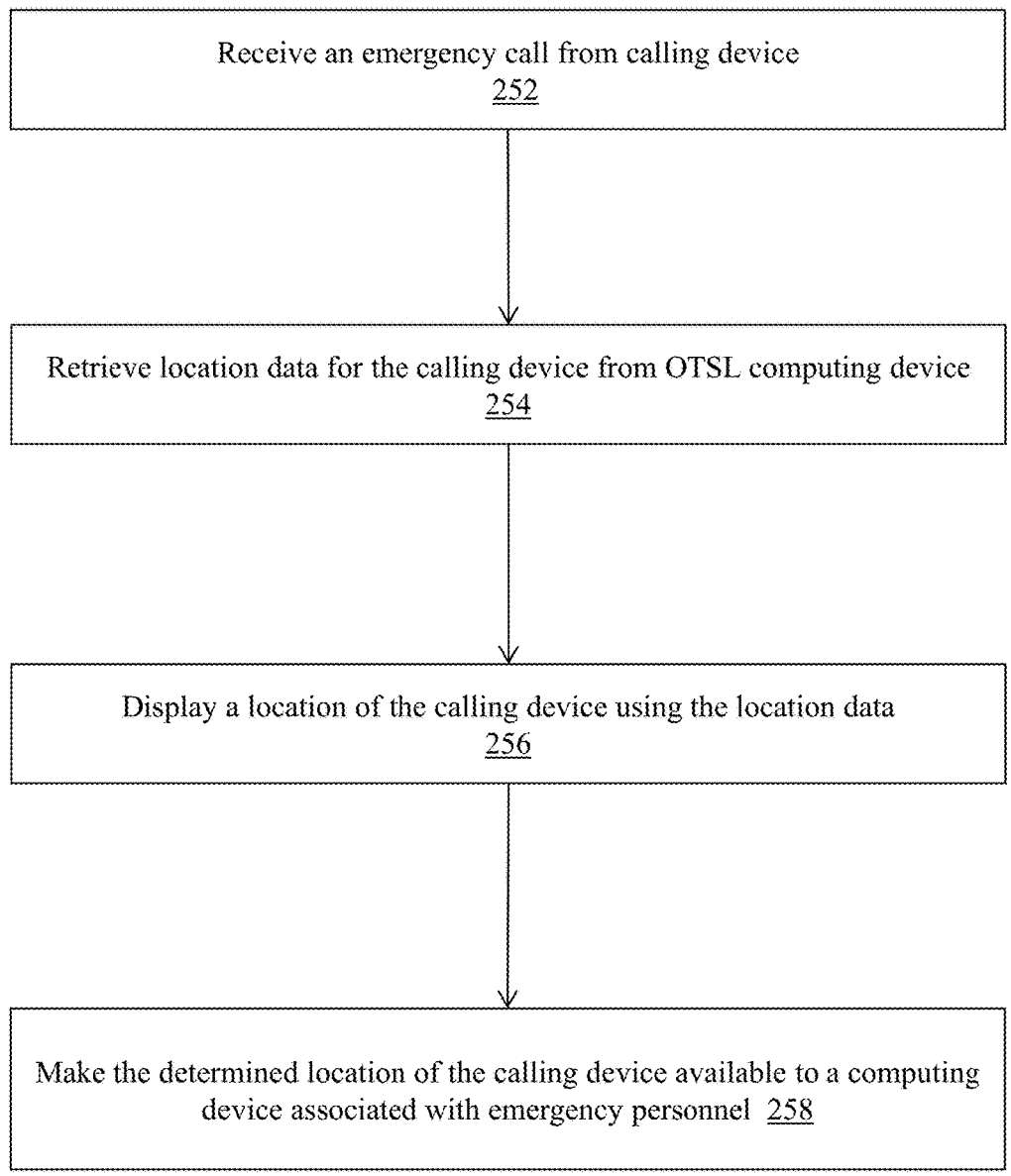
FIG. 2B is a flow diagram of a method for determining and managing the location of a calling device during an emergency call.

FIG. 2B is a flow diagram of a method 250 for determining and managing the location of a calling device during an emergency call, using the system 100 of FIG. 1. The computing device 108 at the PSAP receives (252) an emergency call from the calling device 102 via the cellular communications network 104. The calling device 102 is associated with a unique identifier that enables the system 100 to discretely identify communications initiated from the calling device 102 or discretely identify the device or user initiating the communication. The computing device 108 at the PSAP retrieves (254) location data for the calling device 102 from the OTSL computing device 110 using the unique identifier. The calling device 102 streams the location data to the OTSL computing device 110 via the packet-based communications network 106 upon initiating the emergency call. The computing device 108 at the PSAP displays (256) a location of the calling device 102 based upon the location data retrieved from the OTSL computing device 110. The computing device 108 at the PSAP makes (258) the determined location of the calling device 102 available to a computing device associated with emergency personnel. Further detail on the system 100 of FIG. 1 and methods 200 of FIG. 2A and 250 of FIG. 2B is provided below.

In one embodiment of the system 100 described above with respect to FIG. 1, the call routing and dispatchable location are asynchronous, separate systems. When an emergency call for service is initiated, the calling device 102 is routed into the 9-1-1 infrastructure via legacy 9-1-1 or NG9-1-1 mechanisms. This occurs whether the calling device 102 is a mobile phone using the cellular network, a VoIP client making a call over a WiFi network, or some other combination of communications services and networks. The technologies used to ascertain caller location for the purposes of routing often differ by the communication service and network used to place the call.

An example of a typical cellular/mobile phone emergency call, the Mobile Switching Center (MSC) 104b processing the call assigns a "pseudo-ANI" or "pANI" to the call. The MSC 104b selects this pANI from a pool of pANIs designated for calls placed through the cell tower and cell sector supporting the emergency call (e.g., PDE 104a). The pool of pANIs is provisioned into both the MSC 104b and the 9-1-1 network's Selective Router 104c ahead of accepting any emergency call. This provisioning step includes configuring the Selective Router Database (SRDB) to identify which PSAP should receive a 9-1-1 call based on the emergency caller's (p)ANI. When the MSC 104b forwards the pANI-identified emergency call to the Selective Router 104c, the Selective Router references the SRDB to determine which PSAP should receive the call. As a result, the mobile-originated emergency call is routed to the PSAP having jurisdiction over the geographic area served by the cell tower/cell sector used to complete the call.

In parallel, upon detecting the caller's intent to place an emergency call, the calling device 102 begins streaming its location to a secure service writing to an OTSL computing device 110 and associated data store via a network connection (e.g., packet-based network 106). In one embodiment, this location streaming function is accomplished by a software application on the calling device 102 which detects the intent of the user to place an emergency call. The software application detects intent in a number of ways. The following are examples of how intent is determined: (i) by determining the user placed a call to 9-1-1 or another emergency number; (ii) that an emergency function on the phone was accessed by the user (or an application having such an emergency function was launched); (iii) that the user set a "safety-timer" on their phone such that an emergency state is indicated should the user not deactivate the timer before it expires; or (iv) that the user is located nearby or associated with an organization or location known to be undergoing an emergency event. Those familiar with personal safety applications can envision other related ways to determine the intent to place an emergency call.

The location streaming function can be a stand-alone software application executing on the calling device 102. However, other embodiments include making this functionality available to other software on the calling device 102. In this way, APIs that connect the calling device 102 to the OTSL computing device 110 can be invoked by functionality native to the calling device's operating system (such as the native phone dialer), by other applications running on the operating system of the calling device, or by software applications running remote from the calling device such as a public safety software platform hosted in a remote datacenter or on a computing device at a PSAP.

Upon being notified of the intent to place an emergency call, the OTSL application on the calling device 102 collects information related to the location of the calling device and publishes (or pushes) this location to the OTSL computing device 110 and related data store via the network connection identified above. In some embodiments, the calling device 102 stores the location information locally (e.g., in embedded memory). The network connection between the calling device 102 and the OTSL computing device 110 is typically established by posting collected data to a HTTP web-service hosted by the OTSL computing device 110. In one embodiment, this web-service is invoked over an encrypted connection, and formats the data within a Java-Script Object Notation (JSON) or eXtensible Markup Language (XML) document. Alternatively, other equivalent or improved message formats or protocols may be employed. In some embodiments, the OTSL computing device 110 is either part of the public safety network or the commercial internet. As used herein, "streaming" includes pushing updates to the OTSL computing device 110 at some frequency; this can include, but is not limited to, continuously pushing updates to the OTSL computing device 110 and/or pushing updates on a timed schedule (e.g., every thirty seconds).

In some embodiments, the calling device 102 can begin streaming the location data to the OTSL computing device 110 upon receipt of a message from the OTSL computing device 110 requesting location data. For example, if the computing device at the PSAP 108 receives an emergency call from the calling device 102, the computing device at the PSAP 108 can send a message to the OTSL computing device 110 requesting location data for the calling device 102. In the event that the calling device 102 has not yet begun streaming location data to the OTSL computing device 110 (or perhaps the OTSL computing device 110 has not received any location data, or recent location data, from the calling device 102), the OTSL computing device 110 can transmit a request message to the calling device 102 asking for location streaming to start. In another scenario, the location streaming from the calling device 102 may have been terminated or interrupted. The OTSL computing device 110 can send a message to the calling device 102 (either proactively or in response to a message received from the computing device at the PSAP 108 because the location data is still desired) asking the calling device 102 to re-initiate the location data streaming.

The location information is the best available based on the capabilities of the calling device 102. For example, the device 102 and its software may utilize RF signals, barometric pressure, global positioning system (GPS), or other techniques to determine its location. In some embodiments, the calling device 102 captures a spectrum of location-related information that can assist emergency responders in determining a precise location of the calling device—including information that tracks movement of the calling device over a period of time, or information when analyzed or combined with other information can be used to estimate the location of the calling device. This information can include, but is not limited to, latitude and longitude (e.g., GPS coordinates), altitude (e.g., from GPS and/or barometer), horizontal and vertical accuracy, speed, course/bearing, and so forth.

The location data can be conveyed in any number of formats. The OTSL computing device 110 minimally supports the Presence Information Data Format—Location Object (PIDF-LO) using geographic latitude and longitude points based on the WGS84 Geodetic Datum. Other geodetic datums, as well as providing location information in "civic" or "mailing address" format may be supported by the OTSL computing device. This is carried out in a manner similar to those used by other technologies, such as vehicle navigation applications, social media applications, and other commercial location-based applications and location-enabled services.

The method for providing location information as described herein significantly improves methods currently employed for locating devices placing an emergency call. As the location data is provided outside of an ALI database or other "legacy 9-1-1" functionality, an improved location is made available to PSAPs without requiring modifications to legacy-PSAP components. This is of great value to the 9-1-1 industry, as updating the systems deployed at over 6,000 PSAPs is exceedingly expensive. Furthermore there is little tolerance in the industry and in communities to further invest in legacy technologies scheduled to be made obsolete by NG9-1-1.

Today's "legacy" location technologies can provide updated location information for an emergency caller; however, this information is available only when requested by the PSAP. Consequently, a request for updated location information must be placed in order to detect the availability of more precise location information, or to determine if the caller has moved. In some cases, a response to such requests results in no new information to provide, causing additional traffic that places unnecessary load on the 9-1-1 network and mobile carrier networks. In other cases, precious minutes may elapse between when a caller has moved, and when a request for location update is placed, introducing critical delays in the delivery of life-saving location data. The system and method described herein addresses both of these shortcomings by controlling when location information is transmitted. In that way, the system and method can minimize the use of mobile network and 9-1-1 network resources by only sending information when that information improves upon previously-communicated location information. Additionally, the method and system described herein provides the advantage of ensuring that this improved information is available as soon as it is determined, rather than waiting for the PSAP to request updated information.

Aspects of today's "legacy" 9-1-1 location technology place facets of location determination in the mobile network itself. These components are harder to update in order to take advantage of new technologies, due to the closed and highly controlled management of carrier communications networks, the need to maintain backward compatibility with mobile devices in the field or technology in the network, or even to accommodate peak communications traffic during holidays. By moving additional location determination functionality to OTSL software running on the calling device 102, changes in OTSL processing can be rapidly deployed to the latest devices as they introduce new methods for calculating device location. Furthermore, by locating the majority of location determination processing on the OTSL application running on the calling device 102, there is a reduction in computer processing requirements within mobile networks by taking advantage of computing power native to the calling device 102.

Existing application operating systems provide programmatic interfaces to gather this data on the calling device 102 itself. For example, APIs such as Android™'s Java™ API, LocationListener.onLocationChanged(. .), can be leveraged to determine the calling device's location when the location changes. This approach allows for efficient use of the calling device's battery. For example, iOS devices can utilize the Objective C or Swift APIs, e.g., CLocationManager, to determine the calling device's location.

The location information calculated by commercial location applications, the calling device 102, or the calling device's operating system is provided over a network connection (e.g., network 106) to the OTSL computing device 110. In some embodiments, this "hosted" portion of the OTSL framework runs on one or more computers (e.g., OTSL computing device 110) located at a datacenter, and is separate from the portion of the OTSL framework running on the caller's device 102. In some embodiments, the hosted OTSL components are deployed across scalable computer hardware and are split amongst separate deployable software components including a web-tier, a data access layer, and a relational database. These components are typically deployed across multiple physical locations, replicating both session and functional information to provide the benefits of scalability and redundancy.

At the OTSL computing device 110, each location update is logged into a location registry database 110*b* as well in an in-memory cache. The location updates include data to uniquely identify the calling device 102, the date and time the location data was provided, the location data in geodetic or civic address format. The location updates may also include any or more of: the device make, model, operating system and version, the version of the OTSL software installed on the device, the methodology and sensors used to determine the provided location information, the estimated precision of the location information, the estimated accuracy of the location information, device sensor data used as input into estimating the device's location, and indication of whether the user took manual steps to specify or assist in the determination of the location information.

The OTSL computing device 110 is then accessed by computing devices at authorized PSAPs or other public safety entities (e.g., computing device 108). The net effect is that the OTSL computing device 110 is updated with location information directly from the calling device 102 and awaits a query from a computing device (e.g., 108) at a public safety entity.

In a typical 9-1-1 call scenario, as soon as an emergency call is routed to the answering PSAP, a computing device 108 at the PSAP queries the OTSL computing device 110 for location information associated with the calling device 102. Typically, the PSAP computing device 108 includes a component, running stand alone or as a function of another software component, to acquire and display location information relevant to the emergency call. This component may be a function of Call Taking and Call Control (ACD), Computer Aided Dispatch (CAD), a dedicated mapping solution (GIS), another user-facing application to display Additional Data associated with the emergency call, the emergency caller, or the location. For example, the computing device 108 at the PSAP initiates a secure web-service request to retrieve location information known to the OTSL computing device 110. In one embodiment, the query issued against the OTSL computing device 110 can be based on any unique device identifier seen by the querying computing device and also otherwise known to the OTSL computing device 110.

Examples of unique device identifiers used in legacy 9-1-1 environments include the call ANI, pANI, or call back number. Today, these legacy unique device identifiers are used to route the call to the correct PSAP, retrieve caller location information from the ALI database (e.g., 108a), retrieve the list of police, fire, and EMS first responder organizations whose jurisdiction intersects with the caller's location, to call back the caller in the event the call is dropped, to retrieve any supplemental descriptive information about the caller or the location, to log details of the call in recording and dispatch systems, among other uses.

Examples of other device identifiers include instant message ID, MSID, IMEI, a SIP From-URI, a SIP P-Asserted-Identity, and so forth. The query can be made via existing PSAP computing devices such as call-taking or dispatch equipment or an over-the-top application such as Smart911, available from Rave Mobile Safety of Framingham, Mass., that is installed on a computing device 108 at the PSAP.

In a NG9-1-1 environment, the NG9-1-1 Network Elements can actually query the OTSL computing device 110 to retrieve a unique identifier for the caller's location, such as a URI, and append this identifier to the call as it is routed through the NG9-1-1 network. In some embodiments, such OTSL-generated location URIs are appended into the SIP signaling message, either within the INVITE or MESSAGE message, a Call-Info header, or Geolocation Header. In this case, the location URI is cast by the OTSL computing device 110 and stored alongside the caller's location.

In yet another embodiment, the calling device 102, an app running on the calling device, or a user agent, can insert this additional location URI into the call signaling when the 9-1-1 call is placed. The described components inserting the URI would be responsible for generating the URI, and ensuring the PSAP can use the provided URI to uniquely retrieve location information for the emergency call being processed.

Alternatively, the NG9-1-1 network element (e.g., ESI-net) may query the OTSL computing device 110 for specifics on the caller location (e.g., the calling device's latitude and longitude) based on call identifiers such as the "From URI" or "P-Asserted-Identity."

In some embodiments, location updates can be displayed to the public safety entity on demand as the result of a rebid request, continually updating as new location updates are received by the OTSL computing device 110, or pushed to a computing device 108 at the PSAP when there are significant changes to the location of the calling device 102 as determined based on an algorithm executed by the OTSL computing device 110—as described below. As shown in FIG. 1, the application logic and security module 110a of the OTSL computing device 110 can receive a rebid request from the PSAP computing device 108 (e.g., requesting a location update) and the module 110a can communicate with the calling device 102 to pull a location update from the device 102.

Figure 3:
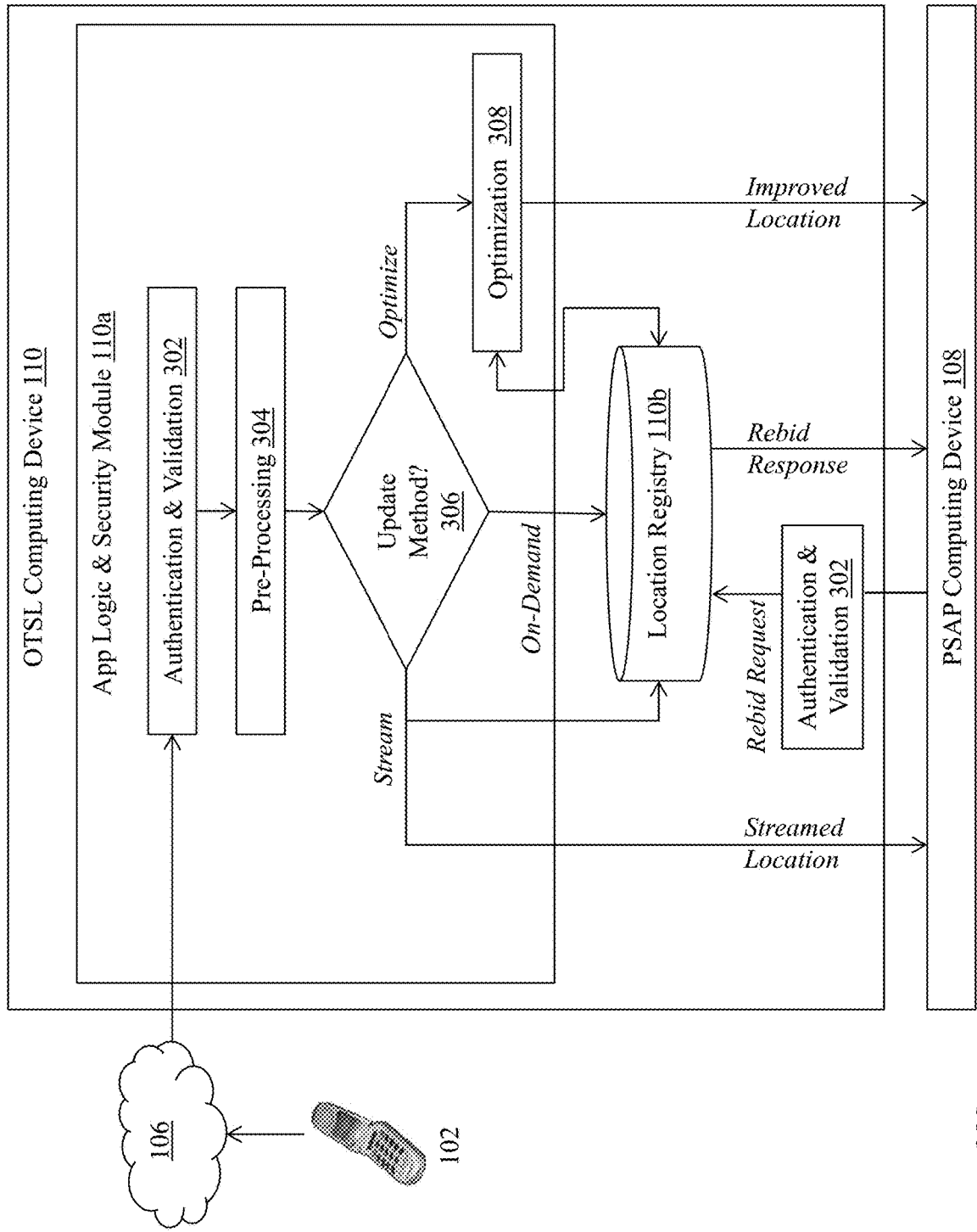
FIG. 3 is an exemplary workflow for determining location updates for a calling device during an emergency call and providing the location updates to a public safety access point (PSAP).

FIG. 3 is an exemplary workflow 300 for determining location updates for a calling device during an emergency call and providing the location updates to a public safety access point (PSAP). Referring to FIG. 3, one implementation of the OTSL technology as it relates to receiving, processing, and making available over-the-top location to PSAPs is as follows. The OTSL component (e.g., an application) on a calling device 102 detects the user's intent to place an emergency call. The location data gathered by the calling device's OTSL component is sent to the OTSL computing device 110 over packet-based network 106. The application logic and security module 110a first authenticates (302) the calling device 102 and pre-processes (304) the location information—which includes enforcing security controls, confirming that the location data contains at least the minimum information required to identify the calling device and/or user, and representing the location of the device. The pre-processing step (304) may take the location data as published by the calling device 102, or the pre-processing step may use information sourced by the calling device 102, alone or in combination with reference data available to the OSTL computing device 110 to calculate the caller location, or improve the location data provided by the calling device 102.

For example, in some embodiments the pre-process step (304) may use a barometric pressure sourced by the calling device 102, knowledge of current atmospheric conditions at the location indicated by the calling device 102, and the height above sea-level at that location to estimate the caller's floor or height above ground-level. Similarly, the OTSL computing device 110 may evaluate information about one or more wireless networks sensed by the calling device 102, and look this information up against an almanac known to the OTSL computing device 110 to calculate a more precise caller location, including identification of a specific building and room associated with the address, or latitude and longitude data reported by the calling device 102. Such a step can also include estimating the accuracy of the estimated location based on these inputs.

The output of the pre-processing step (304) is a validated set of location data for the calling device 102. Once the location data has been pre-processed, the OTSL computing device 110 determines an update method (306) for how the location data should be made available to the computing device 108 at the PSAP. This decision is based upon one or all of the communications preferences configured for the PSAP associated with the calling device's location, the update mode accompanying the PSAP's initial "rebid" request for the emergency call, or another aspect of the interface defined between the OTSL computing device 110 and the computing device 108 at the PSAP.

Also, it should be appreciated that in some embodiments, the OTSL computing device 110 can be configured to authenticate the computing device 108 at the PSAP using any of a multitude of available techniques prior to providing location data to the computing device 108. For example, the OTSL computing device 110 can request credentials (e.g., a key, token, username/password, certificate, or other similar certifying credential) from the computing device 108 at the PSAP and validate those credentials to ensure that the location data is being provided to an authorized entity. In a similar manner, the OTSL computing device 110 and/or the computing device 108 at the PSAP can authenticate a remote computing device (e.g., a first responder's device) prior to making any location data available to the remote device. For example, a PSAP may have access to a broader range of location data for the calling device 102 in order to effectively provide assistance, while the remote device of a first responder may only need certain specific location data—as a result, the OTSL computing device 110 can tailor the types of location data provided to the respective devices using, e.g., a permissions-based or role-based paradigm.

Where it is determined the computing device 108 at the PSAP should receive "streamed" location data, the OTSL computing device 110 logs the location data in the location registry database 110b and immediately forwards the location data to the computing device 108 at the PSAP handling the emergency call. Where it is determined the computing device 108 at the PSAP should receive location updates "on-demand", the OTSL computing device 110 logs the location data in the location registry database 110b where the data is held until the computing device 108 at the PSAP issues a "rebid" request. In some embodiments, all requests from computing device 108 at the PSAP pass through the Authentication and Validation function 302 to ensure the requests for location are authorized and valid.

Where it is determined the computing device 108 at the PSAP wants to receive "optimized" location data, the OTSL computing device 110 first passes the location data through an optimization algorithm 308. The optimization algorithm 308 compares the most recent location received from the calling device 102 to any location data that may have been previously processed for the emergency call. This comparison considers a number of factors, including but not limited to the time elapsed between location updates, a comparison the of estimated accuracy of the most recent and prior location updates, and the horizontal or vertical distance between the most current location result and previously reported device locations. In all cases, the new location is saved to the location registry database 110b, however only those location results that are deemed as improved or significantly different from a prior location (indicating caller movement) are forwarded to the computing device 108 at the PSAP as a location update. The threshold for what constitutes an "improved" location can vary based on PSAP preference, the technologies used to estimate the device's location, or other factors.

The OTSL-sourced location data would most commonly be displayed to the end user at the PSAP via a graphical user interface on a computing device (e.g., device 108) by representing a point, and possibly a related circle or polygon, as an icon or other distinctive iconic or geometric representation on a map. In other embodiments, the location data could be similarly represented on a floorplan image to support even more accurate location results which resolve to a point inside a building, structure, or other representation of a feature such as a parking lot.

Figure 4:
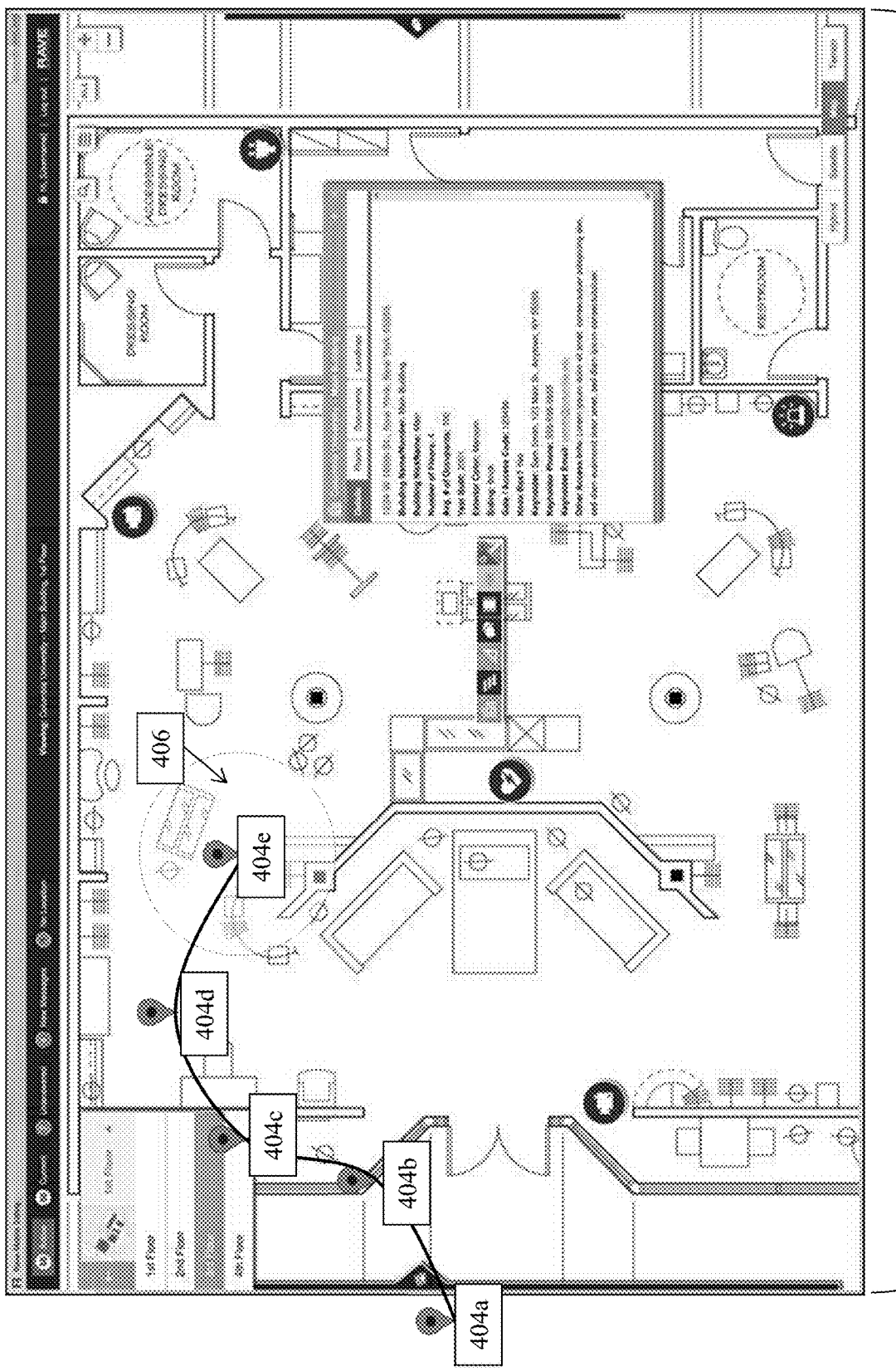
FIG. 4 is an exemplary screenshot a graphical user interface depicting OTSL-sourced location data.

FIG. 4 is an exemplary screenshot of a graphical user interface 402 depicting OTSL-sourced location data, such as on computing device 108. For example, in one embodiment the user interface shown in FIG. 4 can be displayed on a monitor or other display device that is coupled to the computing device 108 at the PSAP. As depicted in FIG. 4, the user interface 402 includes a marker (e.g., marker 404a) that represents a location of the calling device 102 as received from the OTSL computing device 110. When further location updates are received, the user interface 402 can depict these subsequent locations as additional markers 404b-404e in the user interface 402, thereby tracing the movement of the calling device 102 over time. The markers 404a-404e are placed on a map or other graphical representation (e.g., a floorplan) of the actual physical location. As shown in FIG. 4, the user interface 402 shows a floorplan of the third floor of, e.g., a building.

In addition, as described above, the location data associated with the mobile device 102 may be an estimate of the precise location due to, e.g., the relative inaccuracy of the sources of location data available from the calling device 102. As such, in some embodiments the marker 404e representing the most-recently received location of the calling device 102 is surrounded by a circle 406, which represents an approximate area in which the calling device 102 is located. The circle 406 can aid dispatchers viewing the user interface 402 to provide detailed instructions to, e.g., a first responder regarding the expected location of the calling device 102.

Figure 5:
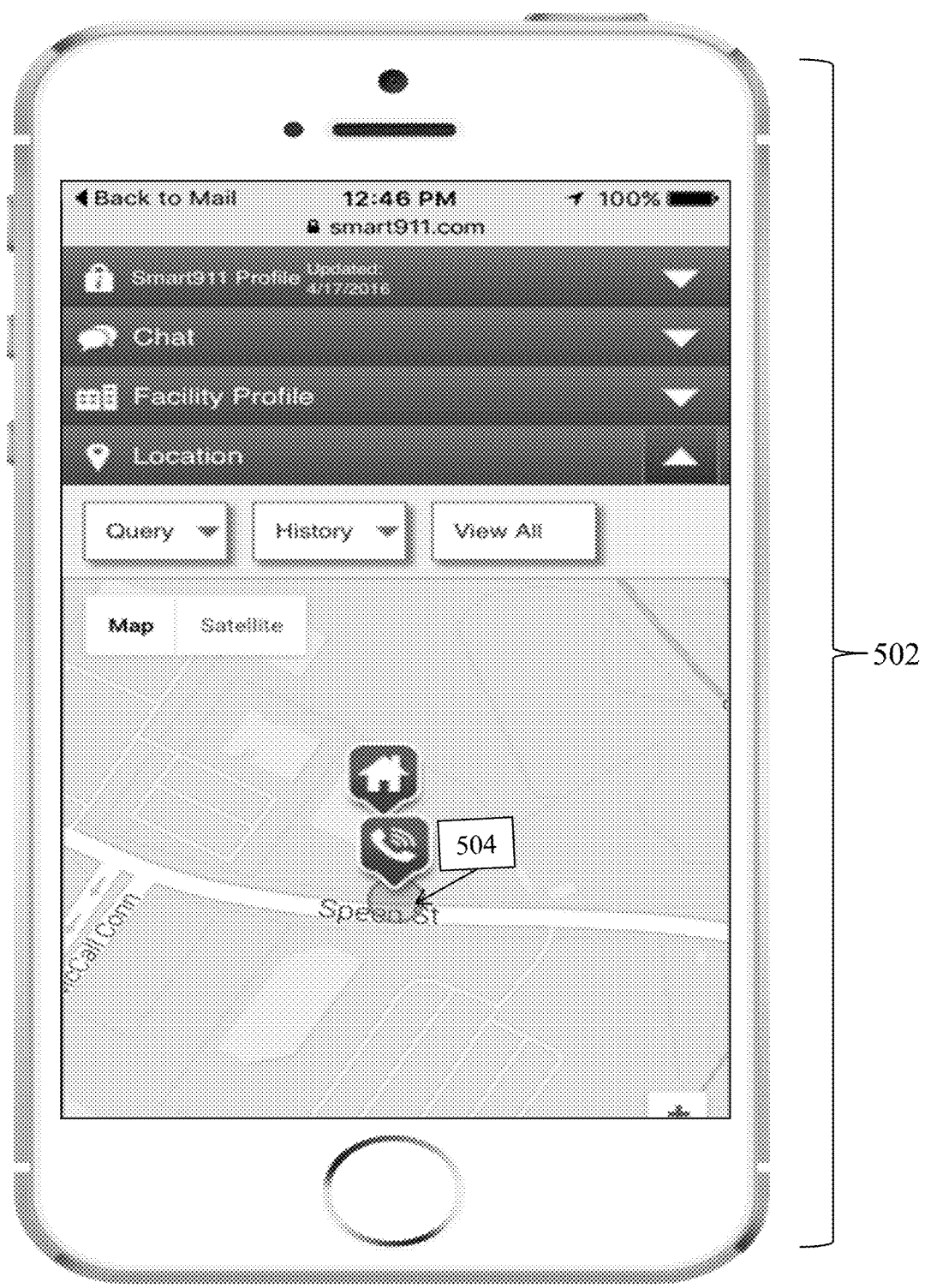
FIG. 5 is an exemplary screenshot a graphical user interface depicting OTSL-sourced location data.

FIG. 5 is an exemplary screenshot a graphical user interface 502 depicting OTSL-sourced location data, such as on a remote computing device (e.g., smartphone) operated by a first responder. As depicted in FIG. 5, the user interface 502 includes a marker (e.g., circle 504) that represents a location of the calling device 102 as received from the OTSL computing device 110 and/or the computing device 108 at the PSAP. The marker 504 placed on a map of the actual physical location. In some embodiments, the marker 504 is annotated with further informational icons (e.g., a telephone icon, a house icon) as shown in FIG. 5. These annotations provide detail to the first responder as to, e.g., the method by which the emergency call was initiated (e.g., via phone) and the type of location or structure that the calling device is located in (e.g., a house). The user interface 502 can also include other features to assist the first responder, such as a toggle to switch the view from map to satellite images, user interface elements to enable querying and review of the calling device's 102 location history, and so forth.

Additionally, by enabling the OTSL computing device 110 to be queried from any authorized public safety agency, agencies are provided with a method of seeing caller location history even when calls are transferred between PSAPs or shared with field units.

It should be noted that the concept of continually pushing dynamic location updates to the OTSL computing device 110 to be made available to authorized public safety entities also applies to WiFi calling applications, instant messaging applications or other applications or devices used to communicate with the PSAP.

In some practices, over-the-top mobile applications use VOIP positioning centers, or VPCs to route calls based on the handset location. In such practices, the location updates may be made to the ALI database (e.g., 108a) in lieu of or in addition to the OTSL computing device 110.

While the primary consumer of OTSL-sourced information is the PSAP, other embodiments of the methods and systems described herein expose the location interface to first responders operating in the field. In these embodiments, first responders are provided with access to a Computer-Aided-Dispatch client (e.g., a mobile computing device), a GIS client, or a client that displays critical or supplemental information about the incident, the dispatch location, or the individual requiring emergency assistance. These clients can also submit rebid requests or subscribe to location updates from the OTSL computing device 110. Alternatively, the computing device 108 at the PSAP may forward OTSL-sourced location data to the first responder, either verbally or via a mobile-data-terminal (MDT), tablet, smart phone, or similar computing device.

It should be noted that the methods and systems described herein have in common with other technologies the continual pushing or streaming of location updates. Examples of such existing technologies are VoIP calling applications which place calls through dialers, user agents, and service providers other than those natively provided by a mobile device or mobile phone network provider. However, the methods and systems described herein distinguish from other existing technologies by making the location information available through the handset-native or hosted components of the OTSL framework (e.g., the OTSL application executing on calling device 102 and the OTSL computing device 110), rather than through an ALI database 108a. The approach described herein realizes many benefits in comparison to legacy 9-1-1 location technologies, as set forth above Furthermore, aggregation of real-time updates of caller location data across multiple callers and calling devices allows for other capabilities not available in current systems. One such application is the possibility of dynamic location aggregation and search. According to this practice, authorized public safety agencies define geographic regions and apply rules to callers that are either in, or transitioning into or out of boundaries of such regions. These rules may include such things as automatic messages sent to callers alerting them to a condition specific to that area.

For example, a hold message for calls in queue might change for a specific caller to indicate that the caller has just entered a region with a particular location-dependent hazard, such as an area affected by a chemical spill, or to indicate 9-1-1 is already aware of a car accident in their immediate vicinity. Because the OTSL framework is not specific to one PSAP region, the rules can be applied across jurisdictional boundaries. For example, in support of callers whose call is routed to a PSAP serving their area at call origination but, over the course of a call, move into a different PSAP region, the OTSL framework can send a message to the individual's calling device 102 to indicate that he or she has moved between jurisdictions and may want to request having their call transferred. Alternatively, callers could be transferred or routed differently as their location changes.

Figure 6:
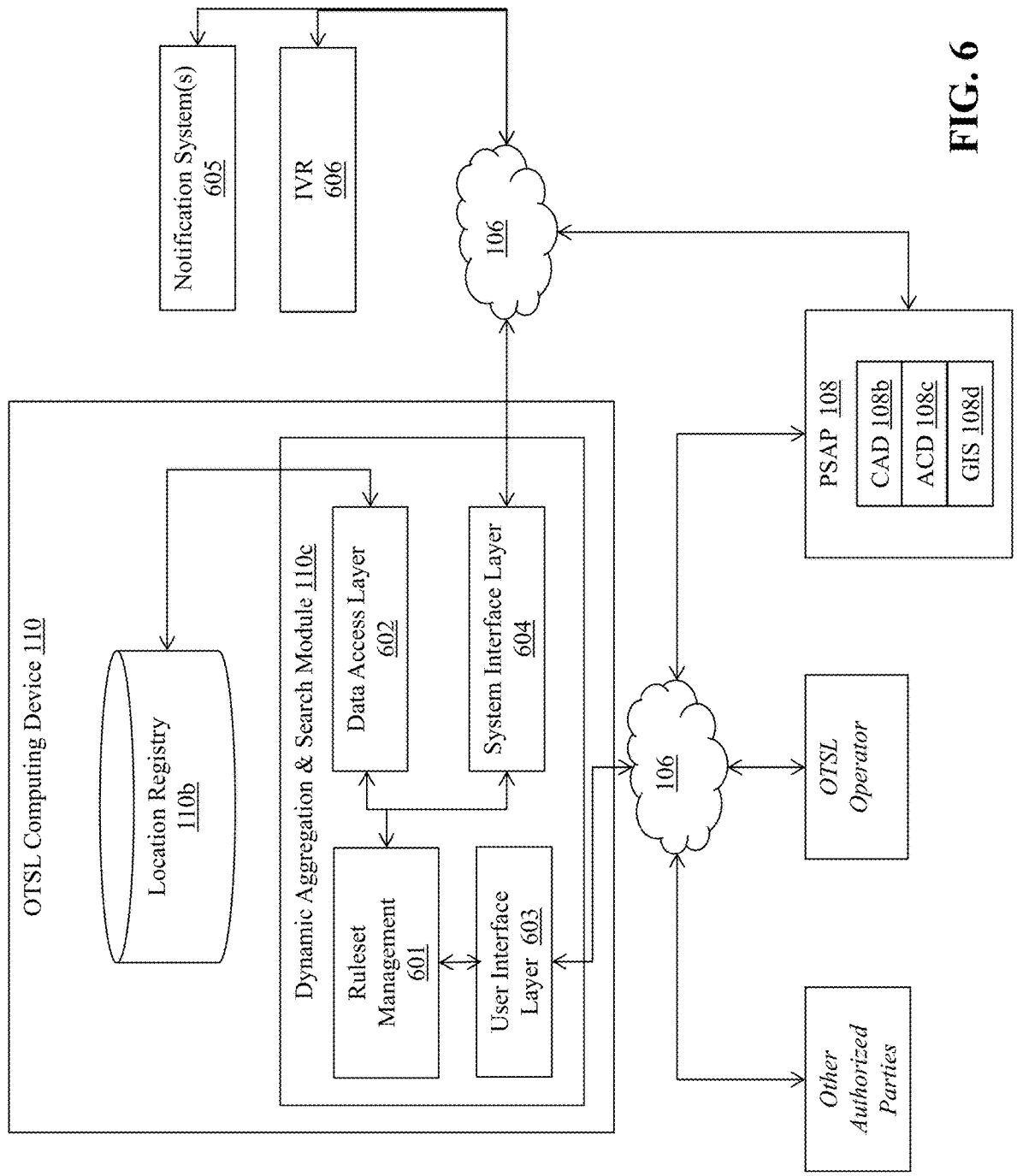
FIG. 6 is a detailed block diagram of the dynamic aggregation and search module of the OTSL computing device.

As mentioned above, the OTSL computing device 110 includes a dynamic aggregation and search module 110c. FIG. 6 is a detailed block diagram of the dynamic aggregation and search module 110c of the OTSL computing device 110. The dynamic aggregation and search module 110c comprises a ruleset management function 601 to support manual and automated means to generate rulesets, a data access layer 602 to execute queries against the location registry database 110b, a user interface layer 603 to present data and expose ruleset management functions based on the logged-in user's access permissions, and a system interface layer 604 to interact with other systems, including but not limited to one or more notification system(s) 605 and an interactive voice response (IVR) system 606.

The rulesets in the ruleset management function 601 consider factors such as a geographic area (via one or more of civic addresses, points and associated radii, polygons, circles, or any geodetic boundary), a day and time range, or other calendar expressions such as a scheduled or recurring day of week or time of day, one or more PSAPs receiving the emergency call, attributes of the incident (e.g. vehicle, fire, robbery, assault, weather, hazardous material, etc.), attributes of the location (e.g. commercial, public, educational), attributes of the response (type and number of responders dispatched, type and number of equipment dispatched). Some of this information is available via the location registry database 110b, while other external data may be sourced through the system interface layer 604 via e.g., network 106 (providing access to data managed by systems outside of the OTSL framework, such as a PSAP's CAD platform 108b).

When a given emergency call matches a manually or automatically generated ruleset, the prescribed system action is referenced and executed. Often these prescribed actions are fulfilled by a system outside of the OTSL computing device 110. These external systems are accessed through the system interface layer 604. These prescribed actions can include sending an audio, video, or text-based message to the caller, transferring the emergency call to a specific resource or PSAP, changing the priority of the emergency call, prompting the emergency caller to leave a recorded message, or send a notification event to system or user other than the PSAP or emergency caller. These prescribed system actions may be fulfilled by systems including, but not limited to, notification systems 605 capable of sending messages via a variety of formats and protocols, such as SMS, email, Common Alerting Protocol, social media integration, among others. Additional interfaces can include interfaces to emergency call answering and routing systems, automated attendant/interactive voice response (IVR) systems 606 to control the routing, play specific messages to the emergency caller, or solicit input from the caller such as via DTMF tones or speech recognition. Interfaces with Automatic Call Distribution 108c platforms, or similar NG9-1-1 functional elements such as Emergency Call Routing Function (ECRF), provide a means to control the routing of the call in progress, including initiating a transfer within or across PSAPs. Interfaces with Computer Aided Dispatch (CAD) systems (e.g., such as the CAD platform 108b at PSAP 108) are also contemplated, for the purposes of detecting known emergency incidents in the vicinity of the caller, or to execute automated dispatch steps to direct first response resources to the emergency caller.

As mentioned above, the OTSL computing device 110 also includes a reporting module 110d. The reporting module 110d provides the operator of the OTSL computing device 110 and/or related components, PSAP customers of OTSL data (e.g., PSAP computing device 108), or other authorized parties with a means for accessing data residing in the location registry database 110b. The reporting module 110d is intended to satisfy needs such as OTSL computing device monitoring and troubleshooting, PSAP call taking metrics, location accuracy compliance reporting, location determination optimization, and geo-spatial analysis of 9-1-1 call history and call routing.

Figure 7:
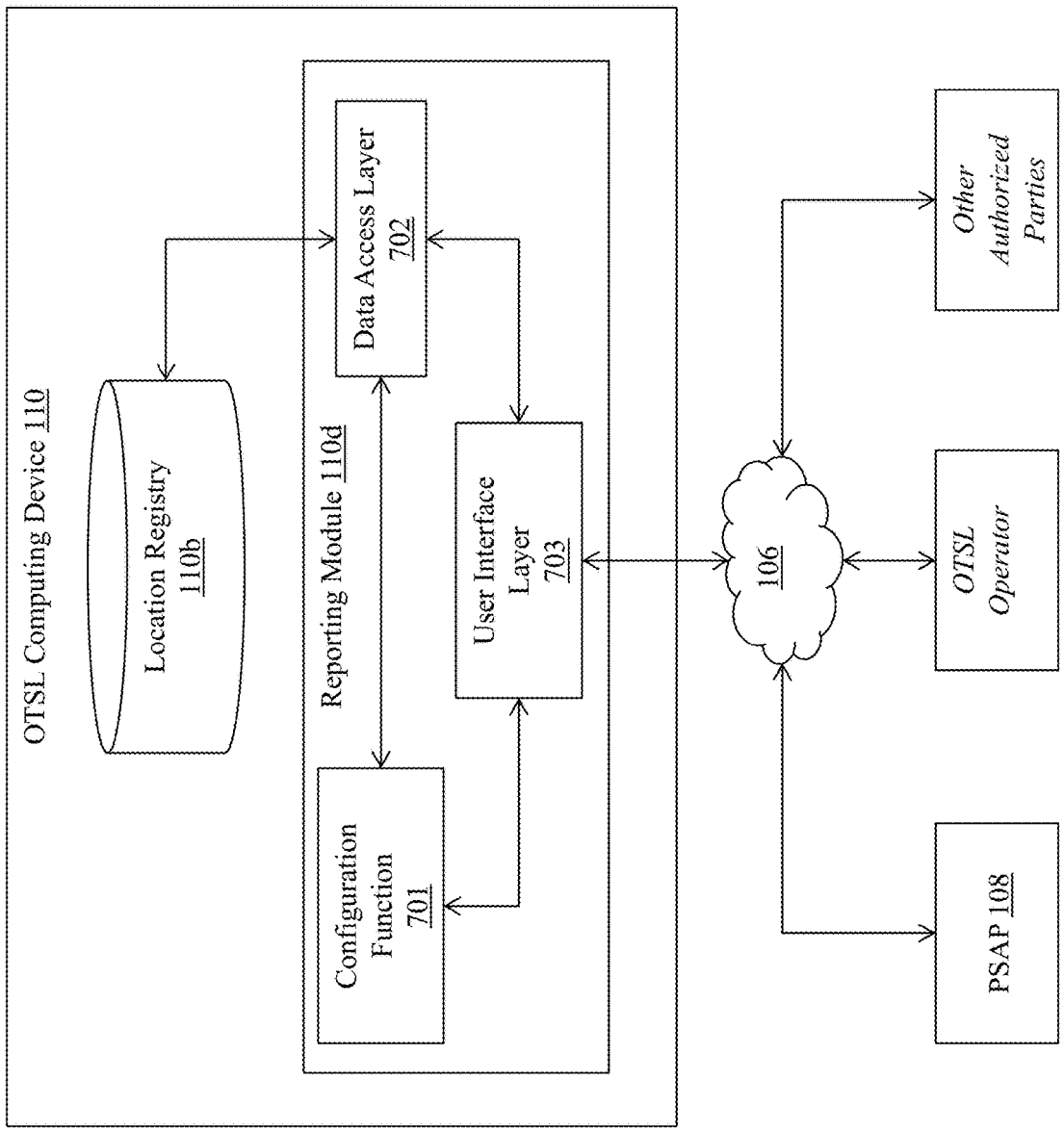
FIG. 7 is a detailed block diagram of the reporting module of the OTSL computing device.

FIG. 7 is a detailed block diagram of the reporting module 110d of the OTSL computing device 110. As shown in FIG. 7, the reporting module 110d includes a configuration function 701 to manage permissions for accessing reporting functionality and to design ad-hoc and pre-canned reports, a data access layer 702 to execute queries specified via the configuration function 701 against the location registry database 110b, and a user interface layer 703 to present reports and expose configuration functions based on the logged-in user's access permissions. In some embodiments, the user interface layer 703 is accessed by software clients connecting over a packet-based network (e.g., network 106).

The reporting module 110d serves as an aggregation point for all data known to the OTSL computing device 110. The access controls and query tools available through the reporting module 110d provide users with access to the information relevant to their needs and authorization. For example, a PSAP Director may be able to report on location data for emergency calls routed to their PSAP. A state-wide 9-1-1 board member may be able to access location quality reports for all emergency calls routed within the state. Alternatively, a mobile phone carrier may be able to access data for the entire country; however, in some cases their results may be limited to emergency calls placed through their own mobile wireless network.

The reporting module 110d can generate reports in a tabular, graphical, or map based representation. Reports can be generated on any combination of information available to the reporting module 110d, including by device type, by the method used to estimate caller location, by date range and/or time range, by PSAP, by mobile carrier, by mobile device or operating system, by estimated location accuracy, or by the absence or presence of information known to the location registry database 110b for a given emergency call.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®, or other proprietary environment).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of determining and managing the location of a calling device during an emergency call, the method comprising:
    establishing, by a computing device at a data store, a connection with a computing device at a public safety access point (PSAP), wherein the connection is established upon activation of an emergency function at a calling device coupled to the computing device at the PSAP via a first communications channel and wherein the calling device is associated with a unique identifier; and
    receiving, by the computing device at the data store, location data for the calling device, wherein the calling device streams the location data to the data store via a second communications channel upon activation of the emergency function;
    comparing, by the computing device at the data store, most recent location data for the calling device to prior location data for the calling device to determine whether a location update is required, including:
        determining a time elapsed between receipt of the most recent location data and receipt of the prior location data,
        determining a difference between an estimated accuracy of the most recent location data and an estimated accuracy of the prior location data,
        determining at least one of a horizontal distance or a vertical distance between the most recent location data and the prior location data, and
        determining whether a location update is required based upon the time elapsed, the difference in estimated accuracy, and the at least one of the horizontal distance and the vertical distance; and
    making available, by the computing device at the data store, the most recent location data for the calling device to the computing device at the PSAP when a location update is required.

2. The method of claim 1, wherein activation of the emergency function on the calling device comprises launching an application on the calling device that comprises the emergency function.

3. The method of claim 2, wherein the calling device establishes a connection to the computing device at the data store while the application is being launched.

4. The method of claim 2, wherein the calling device establishes a connection to the computing device at the data store after the application has finished launching.

5. The method of claim 2, wherein the emergency function comprises a user interface element of the application and activation of the emergency function comprises detecting an interaction with the user interface element.

6. The method of claim 2, wherein the calling device launches the application upon detecting an interaction with a hardware element of the calling device.

7. The method of claim 6, wherein the hardware element of the calling device comprises a button on the calling device.

8. The method of claim 1, wherein activation of the emergency function on the calling device comprises transmitting a message from the calling device to the computing device at the PSAP.

9. The method of claim 8, wherein the message comprises a text message.

10. The method of claim 1, wherein the calling device is a Voice-over-IP (VoIP) client.

11. The method of claim 10, wherein at least a portion of the first communications channel comprises a WiFi network.

12. A system for determining and managing the location of a calling device during an emergency call, the system comprising a computing device at a data store that is configured to:
    establish a connection with a computing device at a public safety access point (PSAP), wherein the connection is established upon activation of an emergency function at a calling device coupled to the computing device at the PSAP via a first communications channel and wherein the calling device is associated with a unique identifier;
    receive location data for the calling device, wherein the calling device streams the location data to the data store via a second communications channel upon activation of the emergency function;
    compare most recent location data for the calling device to prior location data for the calling device to determine whether a location update is required, including:
        determining a time elapsed between receipt of the most recent location data and receipt of the prior location data,
        determining a difference between an estimated accuracy of the most recent location data and an estimated accuracy of the prior location data,
        determining at least one of a horizontal distance or a vertical distance between the most recent location data and the prior location data, and determining whether a location update is required based upon the time elapsed, the difference in estimated accuracy, and the at least one of the horizontal distance and the vertical distance; and make the most recent location data for the calling device available to the computing device at the PSAP when a location update is required.

13. The system of claim 12, wherein activation of the emergency function on the calling device comprises launching an application on the calling device that comprises the emergency function.

14. The system of claim 13, wherein the calling device establishes a connection to the computing device at the data store while the application is being launched.

15. The system of claim 13, wherein the calling device establishes a connection to the computing device at the data store after the application has finished launching.

16. The system of claim 13, wherein the emergency function comprises a user interface element of the application and activation of the emergency function comprises detecting an interaction with the user interface element.

17. The system of claim 13, wherein the calling device launches the application upon detecting an interaction with a hardware element of the calling device.

18. The system of claim 17, wherein the hardware element of the calling device comprises a button on the calling device.

19. The system of claim 12, wherein activation of the emergency function on the calling device comprises transmitting a message from the calling device to the computing device at the PSAP.

20. The system of claim 19, wherein the message comprises a text message.

21. The system of claim 12, wherein the calling device is a Voice-over-IP (VoIP) client.

22. The system of claim 21, wherein at least a portion of the first communications channel comprises a WiFi network.

* * * * *